(12) United States Patent
    Steinhardt (10) Patent No.: US 10,495,483 B2
(45) Date of Patent: Dec. 3, 2019

(54) METHOD AND SYSTEM FOR INITIALIZING A SENSOR FUSION SYSTEM

(71) Applicant: Continental Teves AG & Co. oHG, Frankfurt (DE)

(72) Inventor: Nico Steinhardt, Frankfurt am Main (DE)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 15/374,141

(22) Filed: Dec. 9, 2016

(65) Prior Publication Data

US 2017/0089722 A1 Mar. 30, 2017

Related U.S. Application Data

(63) Continuation of application No. PCT/EP2015/062802, filed on Jun. 9, 2015.

(30) Foreign Application Priority Data

Jun. 11, 2014 (DE) .......................... 10 214 211 175

(51) Int. Cl.
    *G01C 25/00* (2006.01)
    *G01C 21/20* (2006.01)
    *G01C 21/16* (2006.01)

(52) U.S. Cl.
    CPC ......... *G01C 25/005* (2013.01); *G01C 21/165* (2013.01); *G01C 21/20* (2013.01)

(58) Field of Classification Search
    CPC ..... G01C 25/005; G01C 21/165; G01C 21/20
    (Continued)

(56) References Cited

U.S. PATENT DOCUMENTS 4,254,465 A * 3/1981 Land .................. G01C 21/16
                                                   244/175
5,054,719 A    10/1991 Maute
                       (Continued)

FOREIGN PATENT DOCUMENTS

CN        103217157 A     7/2013
CN        103743414 A     4/2014
                (Continued)

OTHER PUBLICATIONS

ISR dated Sep. 2, 2015 of corresponding PCT application PCT/EP2015/062802.

(Continued)

*Primary Examiner* — Tuan C To (57) ABSTRACT

A method and system for initializing a sensor fusion system is disclosed, wherein the sensor fusion system includes a base system and at least one correction system. Measured values are captured by the base system and by the correction system, and the measured values directly or indirectly describing physical quantities are afflicted with error values. The error values describe deviations of the measured values from the described physical quantities, and at least the physical quantities indirectly described in the measured values of the base system and the error values of the physical quantities cannot be determined during initialization. The measured values are continuously fused into a fusion data set after initialization. For at least one of the physical quantities associated with the measured values of the base system and the error values of the physical quantities, starting values are determined from the measured values of the correction system.

17 Claims, 2 Drawing Sheets

(58) Field of Classification Search
USPC .......................................................... 701/501
See application file for complete search history.

(56) References Cited

U.S. PATENT DOCUMENTS

| | | | | |
|---|---|---|---|---|
| 5,272,639 A * | 12/1993 | McGuffin | ............. | G01C 21/005 |
| | | | | 342/63 |
| 5,297,050 A * | 3/1994 | Ichimura | ................ | G01C 21/28 |
| | | | | 340/989 |
| 5,390,125 A * | 2/1995 | Sennott | ............. | B60K 31/0008 |
| | | | | 342/357.24 |
| 5,416,712 A * | 5/1995 | Geier | ................... | G01C 21/165 |
| | | | | 342/357.3 |
| 5,563,611 A * | 10/1996 | McGann | ................... | G01S 1/24 |
| | | | | 342/352 |
| 5,745,868 A * | 4/1998 | Geier | ..................... | G01C 21/28 |
| | | | | 340/988 |
| 5,789,671 A * | 8/1998 | Fernandez | ............. | G01C 21/16 |
| | | | | 33/324 |
| 5,877,723 A * | 3/1999 | Fan | ......................... | G01S 19/49 |
| | | | | 342/357.31 |
| 5,906,655 A * | 5/1999 | Fan | ...................... | G01C 21/165 |
| | | | | 342/457 |
| 5,912,643 A * | 6/1999 | Chew | .................... | G01C 21/16 |
| | | | | 342/457 |
| 5,941,935 A * | 8/1999 | Fernandez | ............ | G01C 21/16 |
| | | | | 701/300 |
| 5,963,662 A * | 10/1999 | Vachtsevanos | ........ | G01N 21/88 |
| | | | | 250/332 |
| 6,092,033 A * | 7/2000 | Uhlmann | ................ | G06F 17/18 |
| | | | | 701/469 |
| 6,240,367 B1 * | 5/2001 | Lin | ........................ | G01C 21/28 |
| | | | | 342/357.31 |
| 9,223,007 B2 * | 12/2015 | Wellman | .............. | G01C 21/165 |
| 9,410,809 B2 * | 8/2016 | Hogdal | ................. | G01C 21/20 |
| 9,625,262 B2 * | 4/2017 | Buck | ..................... | G01C 21/165 |
| 9,699,431 B2 * | 7/2017 | Lamb | ....................... | H04N 9/79 |
| 9,772,186 B1 * | 9/2017 | Tanenhaus | ............. | G01C 19/02 |
| 9,784,582 B2 * | 10/2017 | Georgy | ................... | G01S 19/47 |
| 2005/0240347 A1 | 10/2005 | Yang | | |
| 2009/0326740 A1 | 12/2009 | Wang | | |
| 2012/0065883 A1 * | 3/2012 | Williamson | ......... | G01C 21/165 |
| | | | | 701/501 |
| 2012/0086606 A1 * | 4/2012 | Mathews | ............. | G01C 21/165 |
| | | | | 342/461 |
| 2012/0136573 A1 * | 5/2012 | Janardhanan | ........ | G01C 21/165 |
| | | | | 701/512 |
| 2012/0303221 A1 | 11/2012 | Guenthner et al. | | |
| 2013/0138264 A1 | 5/2013 | Hoshizaki | | |
| 2013/0245933 A1 * | 9/2013 | Castaneda | .............. | G01C 21/16 |
| | | | | 701/445 |
| 2013/0332065 A1 * | 12/2013 | Hakim | .................. | H04W 64/00 |
| | | | | 701/411 |
| 2013/0346017 A1 * | 12/2013 | Stephens | ............... | G01L 321/16 |
| | | | | 702/150 |
| 2014/0236445 A1 | 8/2014 | Dzuibek | | |
| 2014/0333479 A1 * | 11/2014 | Steinhardt | ............... | G01S 19/22 |
| | | | | 342/357.67 |
| 2016/0097862 A1 * | 4/2016 | Yim | ........................ | G01S 19/49 |
| | | | | 701/472 |

FOREIGN PATENT DOCUMENTS

| | | | | |
|---|---|---|---|---|
| CN | 104360366 A | | 2/2015 | |
| DE | 102010063984 A1 | | 8/2011 | |
| DE | 102012216211 A1 | | 3/2013 | |
| DE | 102012216218 A1 | | 3/2013 | |
| DE | 102012219478 A1 * | | 4/2013 | ............. G01S 19/49 |
| DE | 102012219478 A1 | | 4/2013 | |
| EP | 1870669 A2 | | 12/2007 | |
| WO | 9428435 A1 | | 12/1994 | |
| WO | 2013037850 A1 | | 3/2013 | |

OTHER PUBLICATIONS

DE search report dated Dec. 9, 2014 of corresponding German patent application 10 2014 211 175.7.
English Abstract of EP 1 870 669 A2 published on Apr. 10, 2017.
Korean Search Report dated Mar. 6, 2019 for corresponding Korean application No. 2017100328.
Chinese Office Action dated Jul. 29, 2019 for corresponding CN Patent Application No. 201580030373.6.

* cited by examiner

METHOD AND SYSTEM FOR INITIALIZING A SENSOR FUSION SYSTEM

CROSS-REFERENCE TO RELATED APPLICATION

This application is a continuation application of, and claims priority to, international application PCT/EP2015/062802, filed Jun. 9, 2015, designating the United States and claiming priority from German patent application 10 2014 211 175.7, filed Jun. 11, 2014, the content of both applications is hereby incorporated by reference herein in their entirety.

FIELD OF INVENTION

The invention relates to a method for initializing a sensor fusion system.

All measured data is fundamentally prone to errors and in many cases the measured data is not consistently available either. Apart from the dependency of the measured data on the inherent characteristics of the sensor which senses or otherwise measures the data, the measured data is furthermore often dependent upon environmental conditions. Here, sensor errors or measurement errors can be broken down into those errors that are quasi-stationary and constant over multiple measurements, such as, for example, what is referred to as an offset; and those errors that are statistical with a randomness from measurement to measurement, such as noise. While those errors that are random are fundamentally not deterministically correctable, quasi-stationary errors can generally be corrected with a given observability. Uncorrectable significant errors can usually be avoided with a given recognizability. Furthermore, errors in the measured data are often only identifiable following capture and analysis of a series of comparative measurements.

In this context, sensor fusion methods are already known in the art, which are normally also suitable for correcting or filtering measured data from different sensors or sensor systems. In the automobile industry, in particular, special requirements also have to be considered, since a plurality of different sensors capture a common environmental situation or a motor vehicle condition using different measurement principles and describe this environmental situation or motor vehicle condition by means of a plurality of different measured data. For a sensor fusion that can be used in the automobile industry, therefore, robustness against random faults and detection and compensation of systematic errors are desired. The effects of time on the measured data must similarly be corrected and temporary outages or unavailability of sensors bridged.

German patent publication DE 10 2012 216 211 A1 describes a method for selecting a satellite, wherein the satellite is a satellite of a global navigation system. Before such a satellite is used for determining the position of a vehicle, for example, the GNSS signals are checked for plausibility in various ways. Different redundancies or known relations are used for this verification. Thus publication DE 10 2012 216 211 A1, for instance, discloses the determination from the signal of a satellite both the distance of the vehicle to the satellite and also the speed of the vehicle relative to the satellite. Here the distance can be determined by means of the signal traveling time, while the relative speed can be determined by means of a phase measurement of the signal. Since the distance and the relative speed are interdependent, they can be verified against one another. A verification of the values determined from the signal can also be performed against known boundary conditions, since a vehicle usually moves along within a certain speed range. A description is similarly given of how, upon receipt of a plurality of signals from various satellites, the distances to a number of satellites can be determined and these distances simultaneously verified through trigonometric relationships and the known distance of the satellites from one another. Finally, verification of the distance determined from the signal or the speed determined from the signal by means of other sensors, which similarly allow the determination of a position or the determination of a speed, is also possible. Where the signals of a satellite cannot be verified, this satellite is not used in determining the position or determining the speed.

From German patent publication DE 10 2010 063 984 A1, a sensor system including a number of sensor elements is known. The sensor elements are designed so that they, at least to some extent, capture differing primary measured values and, at least to some extent, use different measuring principles. At least, to some extent, further measured values are then derived from the primary measured values of the sensor elements. The sensor system also includes a signal processing device, an interface device and a number of functional devices. Here, the sensor elements and all of the functional devices are connected to the signal processing device. The primary measured values thus provide redundant data which are compared with one another in the signal processing device or are mutually supportive. From the comparison of the observables calculated by a different route, conclusions can be drawn on the reliability and accuracy of the observables. The signal processing device qualifies the accuracy of the observables and provides various functional devices with the observables, together with an indication of their accuracy, via an interface device.

German patent publication DE 10 2012 219 478 A1 discloses a sensor system for independent assessment of the integrity of its data. The sensor system is used in motor vehicles and includes a number of sensor elements, designed so that they, at least to some extent, capture different primary measured values or, at least to some extent, use different measuring principles. The sensor system further includes a signal processing device which, at least to some extent, evaluates the sensor signals collectively and at the same time assesses the information quality of the sensor signals. The signal processing device further provides information on the consistency of at least one datum of a physical quantity, wherein the datum of the physical quantity is calculated on the basis of the sensor signals of sensor elements, with the physical quantity either being directly detected or the physical quantity being calculated from the sensor signals of these. The information on the consistency of the datum is then calculated on the basis of direct or indirect redundant sensor information.

The generic method and sensor systems known from the state of the art are, however, afflicted with disadvantages in this regard, as problems arising upon initialization of these sensor systems are not duly taken into account. Upon initialization, a plurality of physical quantities is, to begin with, not known since no measured data for these quantities can be directly detected. At the same time, the possible errors in these physical quantities are so great that the linearization conditions assumed in the fusion filter for a generic sensor data fusion are invalid, as a result of which the fusion filter and the error estimation performed by it become unstable. This leads to a failure of the sensor fusion.

SUMMARY

An aspect of the invention is therefore to propose an improved method for initializing a sensor fusion system.

Example embodiments of the invention concern a method for initializing a sensor fusion system, wherein the sensor fusion system includes a base system and at least one correction system, wherein measured values are captured by the base system and by the at least one correction system, wherein the measured values directly or indirectly describe physical quantities, wherein the measured values are afflicted with error values, wherein the error values describe deviations of the measured values from the described physical quantities, wherein at least the physical quantities indirectly described in the measured values of the base system and the error values of the physical quantities cannot be determined during the initialization of the sensor fusion system, wherein the measured values are continuously fused into a fusion data set after the conclusion of the initialization and wherein for at least one of the physical quantities indirectly described in the measured values of the base system and the error values of the physical quantities, starting values are determined from the measured values of the at least one correction system.

This results in the advantage that when booting up or starting the sensor fusion system, measured values for all physical quantities required by the sensor fusion system are available from the outset. Thus, the sensor fusion system is essentially fully functional from the outset.

Here, the known sensor fusion systems normally include what is referred to as a fusion filter, which works as a recursive filter. This means, therefore, that the fusion filter reaches a present conclusion on the basis of measured values from the past. Upon initialization of the sensor fusion system, however, there are no measured values from the past available, for which reason the method, according to the example embodiments, uses starting values from the measured values of the at least one correction system, in order to provide the fusion filter with the measured values as starting values.

The example embodiments use the fact that the at least one correction system during initialization generally immediately captures measured values and can make these values available.

When in operation, the sensor fusion system generally fuses the measured data of the base system and the correction system into a common fusion data set which, compared to the individual measured data, is more reliable and more accurate, and in particular allows an assessment of the accuracy or reliability of the fused measured data by means of an error estimation.

In the context of the invention, the term "during initialization of the sensor fusion system" is used synonymously with "during booting up of the sensor fusion system" or "during start-up of the sensor fusion system" and indicates the period of the initialization process of the sensor fusion system. According to the example embodiments, the initialization is considered completed when the fusion filter has received all the information required, as well as the physical quantities described both directly and indirectly in the measured values of the base system for it to function correctly from the base system, and only further requires the measured values of the correction system for the determination of the error values of the base system.

The method, according to an example embodiment of the invention, is preferably not just carried out upon the first initialization of the sensor fusion system, but also during some or all subsequent reinitializations.

The indirectly described physical quantities, and in particular the error values thereof, are preferably determined by means of physical or mathematical relationships from the directly measured physical quantities. An example of an indirectly described physical quantity is, for instance, a speed, which is indirectly described by a change of position over time. The position is thus directly measured as a physical quantity and then from the change in position as time progresses, the speed is determined by means of differentiation.

It is preferably provided that for the creation of the common fusion data set, only measured values with an identical time stamp are used. The measured values thus describe the same physical quantity at the same point in time. Thus, the measured values used are ideally identical or should ideally be so. As a result, the advantage is achieved that error values of the measured values can be better identified more reliably. Thus, the accuracy and/or reliability of the fusion data set are also improved.

It is preferably provided that the common fusion data set includes at least the error values of the base system, wherein the error values of the base system are determined by comparison with the measured values of the at least one correction system and possibly by an assessment of the measured values of the base system against the measured values of the at least one correction system.

It is further preferred that the least one correction system determines the starting values and the correction values in each case by means of an independent measured value processing. To this end, the at least one correction system can, by way of example, include its own pre-processing of the measured values that is as far as possible independent of the sensor fusion system. Particularly in connection with what is referred to as tightly coupling, the at least one correction system initially independently determines the values of those physical quantities, described by the measured values of the at least one correction system. During this pre-processing, then, it is already possible to perform a first correction of the measured values of the at least one correction system.

It is further preferred that the base system is an inertial navigation system and that the at least one correction system is a global satellite navigation system and/or an odometry navigation system. Thus, the example embodiments of the present invention are particularly suitable for navigation purposes and for navigation systems, preferably in motor vehicles. The sensor fusion system thus determines the position, in particular the position of a motor vehicle, from the measured values. The global satellite navigation system can, by way of example, be what is referred to as a GPS navigation system. The odometry navigation system initially determines the speed, e.g., from the known rolling circumference of the motor vehicle tires, and thus allows position determination taking into account the steering angle in the context of dead-reckoning. It is particularly beneficial for the satellite navigation system to include at least two satellite signal receivers. This improves the quality of the satellite signals captured and thus the reliability and accuracy of the satellite navigation system.

It is preferred that the starting values for the error values are determined as variances on the basis of the measuring inaccuracies of the at least one correction system. Thus, in the first instance, account is taken of the fact that the sensor fusion system or the fusion filter generally also determines error values and the presence of measured values is required for this. Because now the variances of the measured values of the at least one correction system can therefore be used as starting values for the error values, these values can also be made available to the sensor fusion system or the fusion filter comparatively easily.

In particular, it is preferred here that the measuring inaccuracies are obtained from the sensor specifications or a datasheet of the sensors of the base systems or of the at least one correction system, or determined by error propagation. The basis for the determination by error propagation is the own assessment of the measuring accuracy by the base system or the at least one correction system and the respective pre-processing. Here the pre-processing is generally used for known sensor fusion systems anyway and can thus be used without additional effort for the method according to an example embodiment of the invention.

It is advantageously provided that the physical quantities indirectly described in the measured values of the base system include a speed, a position, a receiver clock error of the global satellite navigation system and/or a receiver clock error drift of the global satellite navigation system. These quantities can be determined directly from the correction systems, in particular in the case of a global satellite navigation system and an odometry navigation system.

It is further preferred that the starting values are determined progressively from the measured values of the at least one correction system. Thus, the advantage is achieved that the initialization speeds and possibly other characteristics of the various correction systems can be taken into account, as a result of which individually adapted, timely provision of the measured values as starting values to the correction systems is enabled. The starting values are thus provided in the time sequence in which they are indicated by the correction systems.

It is further particularly preferred that initially starting values are determined from the measured values of the odometry navigation system. The odometry navigation system has the advantage that as soon as the vehicle is started it can capture wheel speed signals and thus determine the speed as soon as the vehicle is started. The wheel speed signals are also of particular importance for vehicle safety, since not only are the speed signals used for speed determination, but also for various driver assistance systems such as, for instance, anti-lock brake systems (ABS) and electronic stability controls (ESC).

It is advantageous that the error values are identified and in particular corrected, by means of an error state space filter, in particular by means of an error state space Kalman filter. Here the error state space filter constitutes a fusion filter for the fusion of the measured values, in particular for the fusion of normal distributed measured values. Simultaneously, the error state space filter preferably estimates or determines the error values of at least the base system. The base system is preferably an inertial navigation system of a motor vehicle. By means of the correction systems, the error values and possibly also unknown quantities of the inertial navigation system can then be estimated or determined. A special feature of the error state space filter is therefore that instead of the sensor signals or measured values, only error values are incrementally estimated or determined and then corrected. The error values have significantly lower temporal dynamics than the measured values themselves, resulting in an extensive decoupling of the dynamics of the error state space filter from the characteristics of the base system or of the at least one correction system, as a result of which an extensive decoupling of the dynamics of the error state space filter from the sensor characteristics is achieved.

A further special feature of the error state space Kalman filter is that by applying a correction, the estimated or determined error values following each working cycle of the error state space Kalman filter are zero, as a result of which an otherwise normal prediction step for forecasting the error values in the following working cycle can be dispensed with, as a result of which therefore the calculation effort for the error state space Kalman filter is reduced.

Example embodiments of the invention further relate to a system for initializing a sensor fusion system, wherein the sensor fusion system includes a base system and at least one correction system, wherein the base system and the at least one correction system are in each case designed to capture measured values, wherein the measured values directly or indirectly describe physical quantities, wherein the measured values are afflicted with error values, wherein the error values describe deviations of the measured values from the described physical quantities, wherein the sensor fusion system is designed so that at least the physical quantities indirectly described in the measured values of the base system and the error values of the physical quantities cannot be determined during the initialization of the sensor fusion system, wherein the sensor fusion system is designed to continuously fuse the measured values after the conclusion of the initialization into a fusion data set and wherein the sensor fusion system is designed, for at least one of the physical quantities indirectly described in the measured values of the base system and the error values of the physical quantities, to determine starting values from the measured values of the at least one correction system. The system, according to example embodiments of the invention, thus includes all necessary devices for carrying out the method.

It is preferably provided that the system is designed to carry out the method according to example embodiments of the invention.

Example embodiments of the invention further relate to a use of the system in a motor vehicle.

BRIEF DESCRIPTION OF THE DRAWINGS

Example embodiments will be explained below in the following description in conjunction with the drawings, in which.

DETAILED DESCRIPTION

Figure 1:
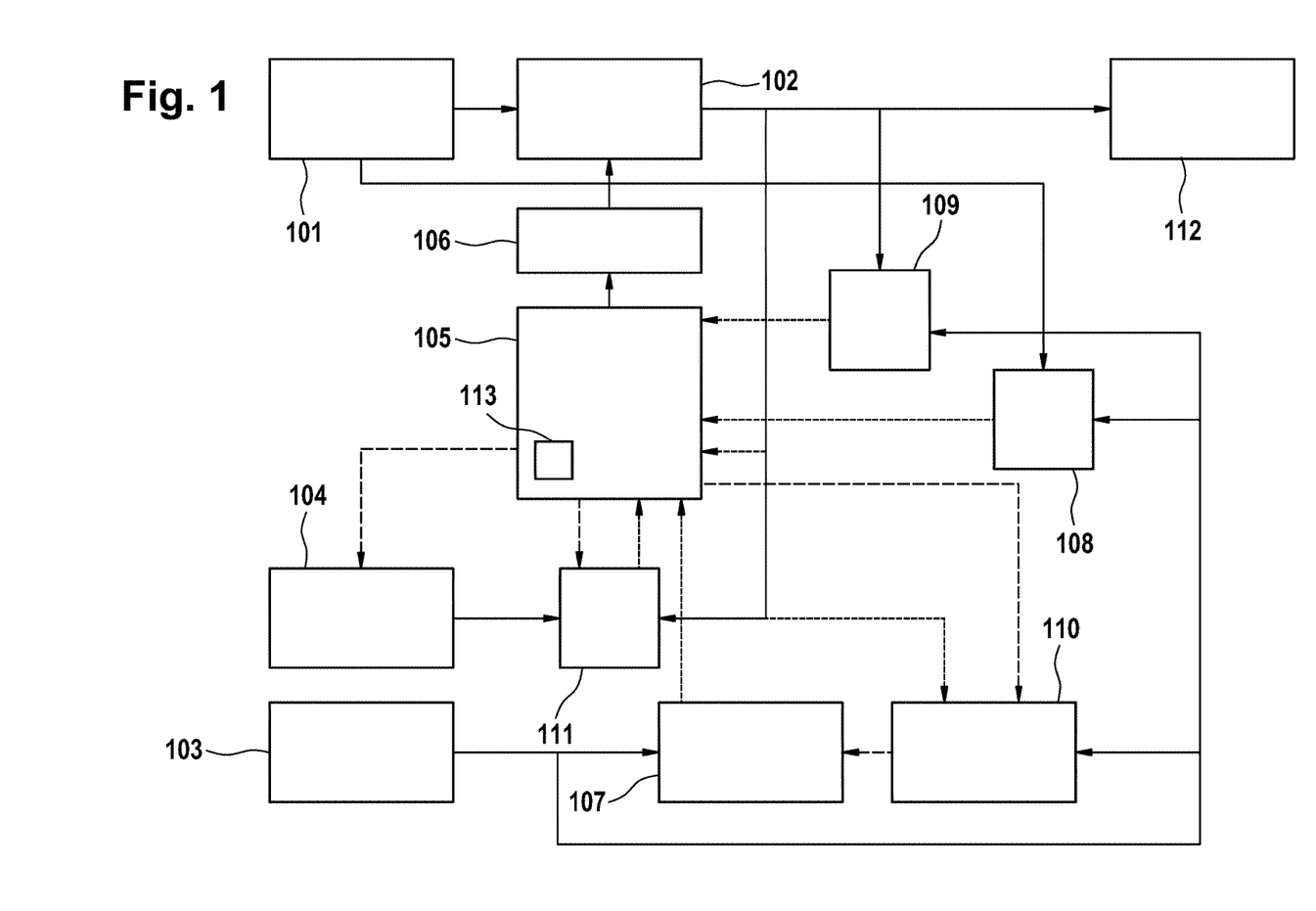
FIG. 1 a diagram illustrating an example embodiment of a system in a motor vehicle which is designed for position determination.

FIG. 1 is a schematic representation of an embodiment of the system according to an example embodiment of the invention, intended for arrangement and use in a motor vehicle (not shown). The sensor fusion system shown is, by way of example, designed for position determination of the motor vehicle. Here, all the elements or components of the system, the base system or the correction systems are shown as functional blocks and the interaction of these blocks is illustrated.

The sensor fusion system includes inertial navigation system 101, designed to capture at least the accelerations along a first, a second and a third axis, and at least the yaw rates about the first, about the second and about the third axis. Here, the first axis corresponds, for example, to the longitudinal axis of the motor vehicle, the second axis corresponds to the transversal axis of the motor vehicle and the third axis corresponds to the vertical axis of the motor vehicle. These three axes form a Cartesian system of coordinates, referred to as the motor vehicle coordinate system.

Inertial navigation system 101 forms, for example, what is referred to as the base system, the measured values of which are corrected by means of what are referred to as correction systems as described in the following. Here, the correction systems are odometry navigation system 103 and satellite navigation systems 104.

The sensor fusion system also has what is referred to as a strapdown algorithm unit 102, in which what is referred to as a strapdown algorithm is executed by means of which the measured values of inertial sensor navigation system 101 are converted, inter alia, into position data. To this end, the measured values of inertial sensor navigation system 101, which of course describe accelerations, are integrated twice over time. A direction of the motor vehicle is also determined over time by double integration of the corresponding measured values of inertial sensor navigation system 101 over time. By means of single integration over time, the direction and speed of the motor vehicle are also determined. The strapdown algorithm unit 102 further compensates for a Coriolis effect acting on the inertial sensor navigation system 101.

The output data of strapdown algorithm unit 102 accordingly includes the following physical quantities: the speed, the acceleration and the yaw rate of the motor vehicle, for example, with regard to the three axes of the motor vehicle coordinate system and, for example, additionally in each case in relation to a world coordinate system suitable for describing the direction or dynamic quantities of the motor vehicle in the world. By way of example, the world coordinate system is a GPS coordinate system. The output data from the strapdown algorithm unit 102 further includes the position in relation to the motor vehicle coordinate system and the direction in relation to the world coordinate system. The output data of strapdown algorithm unit 102 also features variances as information on the data quality of the abovementioned physical quantities. These variances are, for example, not calculated in the strapdown algorithm unit 102; the variances are simply used by the strapdown algorithm unit 102 and passed on. The abovementioned physical quantities calculated by the strapdown algorithm unit 102 are output via output module 112 and made available to other motor vehicle systems.

The sensor fusion system further includes odometry navigation system 103 in the form of wheel speed sensors for each wheel of the motor vehicle. As an example, a four-wheel motor vehicle is involved or associated with four wheel speed sensors, which in each case captures the speed of the wheel assigned and its direction of rotation. The odometry navigation system 103 also includes a steering angle sensor element which captures the steering angle of the motor vehicle. In addition, odometry navigation system 103, for example, provides fusion filter 105 with a starting speed or starting speed information at least upon start-up, switching on or initialization of the sensor fusion system.

Moreover, the sensor fusion system shown, as an example, features satellite navigation system 104, which is designed to determine the distance in each case between an associated satellite and the vehicle, and the speed in each case between the associated satellite and the motor vehicle. In addition, the satellite navigation system 104, for example, provides fusion filter 105 with a starting position or starting position information at least upon starting, switching on or initialization of the sensor fusion system.

The sensor fusion system further includes fusion filter 105. Fusion filter 105 provides a fusion data set 106 in the course of the combined assessment of the measured data from the odometry navigation system 103, the satellite navigation systems 104 and the inertial sensor navigation system 101. Fusion data set 106 features the captured measured data of the various sensor systems, wherein fusion data set 106, for example, also includes error values and the variances assigned to the error values describing the data quality.

The measured data or values of inertial sensor navigation system 101 are stored during operation of the motor vehicle in an electronic data memory 113 of fusion filter 105 for a specified time. Here, inertial navigation system 101 represents what is referred to as the base system, while odometry navigation system 103 and satellite navigation system 104 represent what are referred to as correction systems, the measured values of which are used for correction of the measured values of the base system. This ensures that values that are at least ostensibly captured at the same point in time can always undergo the comparison.

Fusion data set 106 provided by fusion filter 105 includes, for example, the quantitative errors of the base system determined by means of the plausibility-checked measured values of the correction system.

Strapdown algorithm unit 102 now corrects the measured values of the base system by means of fusion data set 106.

Fusion data set 106 is calculated by fusion filter 105 from the measured values of odometry navigation system 103, satellite navigation systems 104 and inertial navigation system 101.

Fusion filter 105 is, for example, designed as an error state space Kalman filter, thus as a Kalman filter, carries out a linearization of the measured values and in which the quantitative error values of the measured values are calculated or estimated and which works sequentially and in doing so corrects the measured values available in the respective function step of the sequence.

Fusion filter 105 is designed so that the filter always asynchronously captures the most up-to-date measured values available from inertial navigation system 101, odometry navigation system 103 and satellite navigation system 104. For example, here the measured values are passed through the motor vehicle modeling unit 107 and direction modeling unit 109.

Motor vehicle modeling unit 107 is designed so that from the measured values of the odometry navigation system 103, unit 107 calculates at least the speed along a first axis, the speed along a second axis and the yaw rate about a third axis and provides these to fusion filter 105.

The exemplary sensor fusion system further includes tire parameter estimation unit 110, which is designed so that unit 110 calculates at least the radius, for example the dynamic radius, of all wheels and also calculates the skew stiffness and the slip stiffness of all wheels and provides these calculations to motor vehicle modeling unit 107 as additional input variables. Tire parameter estimation unit 110 is also designed so that unit 110 uses a substantially linear tire model for the calculation of the tire sizes.

Here, the example input variables of tire parameter estimation unit 110 are the measured values describing the wheel speeds and the steering angle, at least to some extent the output values of strapdown algorithm unit 102 and the variances determined by fusion filter 105.

The exemplary sensor fusion system further includes GPS error detection and plausibility checking unit 111, which is designed so that as input data, for example, unit 111 receives the measured values of satellite navigation system 104 and at least to some extent measured values from strapdown algorithm unit 102 and takes these into account in its calculations. GPS error detection and plausibility checking unit 111 checks the measured values against a stochastic model adapted for satellite navigation system 104. Where the measured values are consistent with the model in terms of a tolerance that takes account of the noise, the values are checked for plausibility.

Here, the GPS error detection and plausibility checking unit 111 is also connected with fusion filter 105 at the data level and forwards plausibility-checked measured values to fusion filter 105.

GPS error detection and plausibility checking unit 111 is, for example, designed so that unit 111 carries out a method for selecting a satellite, inter alia, by means of the following method steps:
- measuring position data of the motor vehicle in relation to the satellite based on the sensor signals of satellite navigation system 104,
- determining redundant reference position data of the motor vehicle for the position data determined on the basis of the sensor signals of satellite navigation systems 104,
- selecting the satellite, if a comparison of the position data and the reference position data satisfy a predefined condition,
- wherein for comparing the position data and the reference position data, a difference between the position data and the reference position data is formed,
- wherein the predefined condition is a maximum permitted deviation of the position data from the reference position data,
- wherein the maximum permitted deviation is dependent upon a standard deviation calculated based on a sum of a reference variance for the reference position data and a measurement variance for the position data, and
- wherein the maximum permitted deviation corresponds to a multiple of the standard deviation so that a probability that the position data falls in a spread interval dependent upon the standard deviation, is below a predefined threshold value.

The example sensor fusion system further features halt detection unit 108, designed so that unit 108 can detect a halting of the motor vehicle and in the event of detecting a halting of the motor vehicle, provides at least fusion filter 105 with information from a halt model. Here, the information from a halt model describes how the yaw rates about all three axes have a value of zero and the speeds along all three axes have a value of zero. Here, halt detection unit 108 is, for example, designed so that unit 108 uses the measured values of the wheel speed sensors of odometry navigation system 103 and the measured values of inertial navigation system 101 as input data.

The sensor fusion system uses, for example, a first group of measured values relating to a motor vehicle coordinate system and also a second group of measured values relating to a world coordinate system, wherein the world coordinate system is used for describing the direction and dynamic quantities of the motor vehicle. By means of direction modeling unit 109, a direction angle between the motor vehicle coordinate system and the world coordinate system is determined.

The direction angle determined by the direction modeling unit 109 between the vehicle coordinate system and the world coordinate system is determined here on the basis of the following physical quantities:
- the vectorial speed with reference to the world coordinate system,
- the vectorial speed with reference to the motor vehicle coordinate system,
- the steering angle, and
- the respective quantitative errors of the measured data or values describing the quantities.

Here, direction modeling unit 109 refers to all of the output data of strapdown algorithm unit 102.

Direction modeling unit 109 is, for example, designed so that in addition to the direction angle, unit 109 calculates further information on the data quality of the direction angle in the form of a variance and provides this to fusion filter 105.

Fusion filter 105 uses the direction angle and the variance of the direction angle in its calculations, the results of which fusion filter 105 forwards via fusion data set 106 to strapdown algorithm unit 102.

Fusion filter 105 thus captures the measured data of inertial navigation system 101, the base system, and odometry navigation system 103, and also from satellite navigation system 104 and the correction systems.

During an initialization of the example sensor fusion system, all sensor systems that the sensor fusion system includes, thus the base system 101, the two correction systems 103 and 104 and fusion filter 105, are initialized. For correct functioning, immediately after initialization, fusion filter 105 is also dependent upon the physical quantities directly and indirectly described in the measured values of base system 101, which by means of the measured values of correction systems 103 and 104 are corrected or the error values of these are determined by means of correction systems 103 and 104. Since the physical quantities indirectly described in the measured values of base system 101, for instance the position and speed of the vehicle, cannot yet be determined, however, for this purpose starting values are determined from the measured values of correction systems 103 and 104. Odometry navigation system 103 determines, for example, a speed of the vehicle and makes this available to fusion filter 105 as the starting value for the speed determination. A measuring inaccuracy inherent in an odometry navigation system 103 is similarly indicated as the starting value for the error value of the speed to fusion filter 105. As soon as satellite navigation system 104 has performed a first determination of the position, the position determined in this way is also indicated as the starting value for the position to fusion filter 105. Simultaneously, a variance is output on the basis of the measuring inaccuracy of the determined position as the error value of the determined position to fusion filter 105. Here, the position determined as a starting value and the measuring inaccuracy are determined in the course of a pre-processing of measured values of satellite navigation system 104. Similarly, the speed determined as the starting value is determined in the course of a pre-processing of odometry navigation system 103, but not the measuring inaccuracy used as the starting value for the error value. This is derived, for example, from the sensor specifications of the individual wheel speed sensors. Thus the information required for correct operation is already available to fusion filter 105 during initialization.

Figure 2:
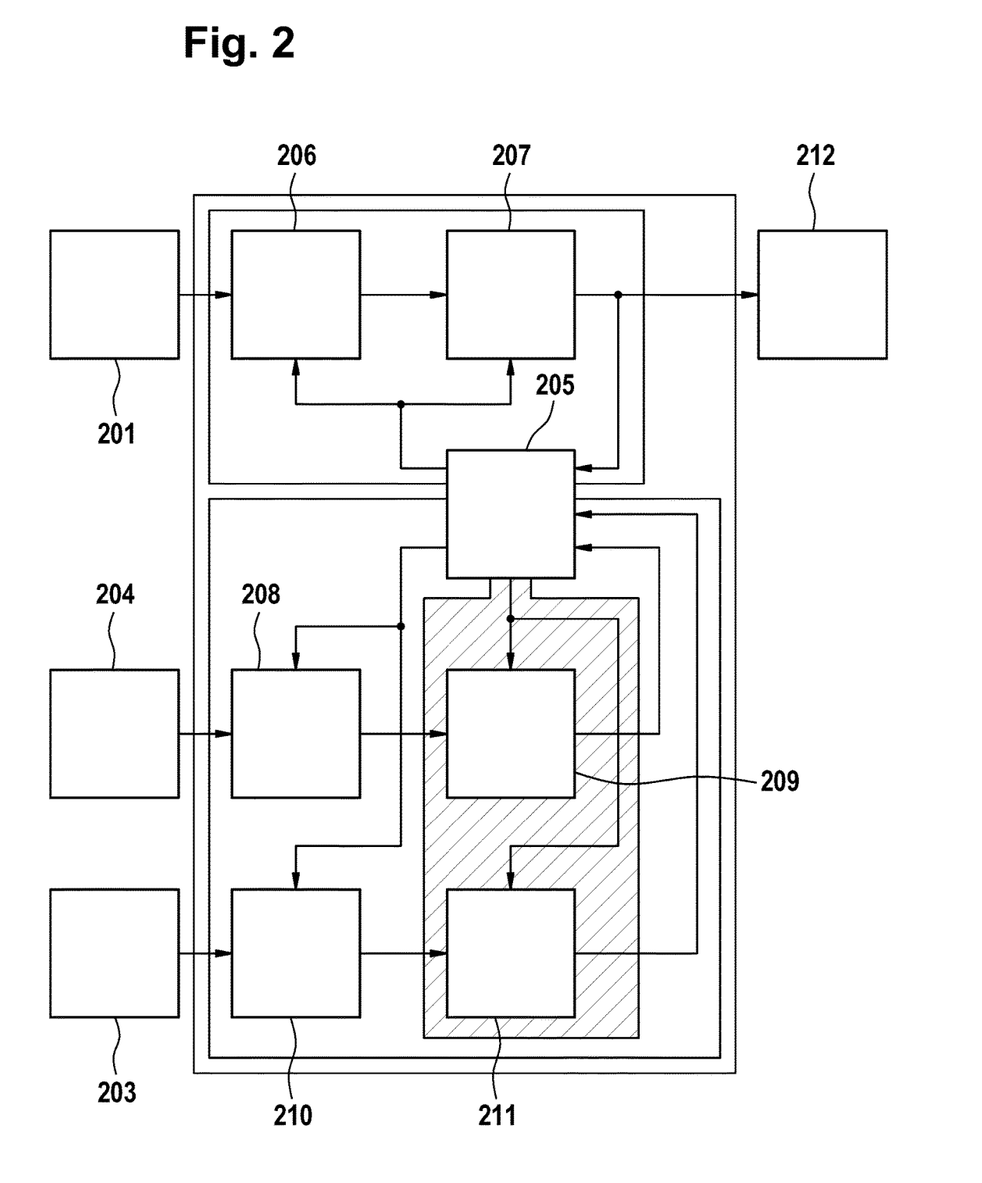
FIG. 2 is a diagram illustrating an example embodiment of a system in a motor vehicle which is similarly designed for position determination.

FIG. 2 shows, by way of example, a further possible embodiment of a sensor fusion system, which is similarly designed for position determination in a motor vehicle (not shown). The sensor fusion system includes, for example, inertial navigation system 201, satellite navigation system 204 and odometry navigation system 203 as different sensor systems. Inertial navigation system 201, satellite navigation system 204 and odometry navigation system 203 output measured values which describe direct or indirect physical quantities, namely a position, a speed, acceleration, a direction, a yaw rate or a yaw acceleration, to fusion filter 205. Here, the output of the measured values takes place via a vehicle data bus, for example, via what is referred to as a CAN bus. For example, satellite navigation system 204 outputs its measured data in the form of raw data.

As a central element in a position determination of the motor vehicle, inertial navigation system 201, which involves what is referred to as a MEMS-IMU (Microelectromechanical Systems Measurement Unit), is used in combination with strapdown algorithm unit 207, since this is assumed to be error-free, i.e., it is assumed that the values of inertial navigation system 201 always correspond to their stochastic model that they are afflicted only by noise and are thus free from external or random errors. Here, the noise and remaining, unmodeled errors of inertial navigation system 201 such as, for example, nonlinearity, are assumed to be zero-mean, stationary and normally distributed according the measurement range (referred to as Gaussian white noise).

Inertial navigation system 201 includes three yaw rate sensors capturing orthogonally to one another and three acceleration sensors capturing orthogonally to one another.

Satellite navigation system 204 includes a GPS receiver, which determines a path travelled by the motor vehicle during the satellite signal travelling time and initially performs measurements of the distances to the receivable GPS satellites and further from the change in satellite signal travelling time and also the change in the number of wavelengths of the satellite signals. Odometry navigation system 203 includes a wheel speed sensor on each wheel of the motor vehicle and a steering angle sensor. The wheel speed sensors each determines the wheel speed of the associated wheel and the steering angle sensor determines the steering angle covered.

Inertial navigation system 201 outputs its measured values to pre-processing unit 206 of inertial sensor navigation system 201. Pre-processing unit 206 now corrects the measured values or the physical quantities described therein by means of correction values which pre-processing unit 206 receives from fusion filter 205. The measured values corrected in this way, or the physical quantities described therein, are forwarded to strapdown algorithm unit 207.

Strapdown algorithm unit 207 uses the corrected measured data or values from pre-processing unit 206 to now perform a position determination. Here, this position determination is what is referred to as dead-reckoning on the basis of inertial navigation system 201. To this end, the corrected measured values or the physical quantities described therein, output by pre-processing unit 206, are continuously integrated or summed up over time. Strapdown algorithm unit 207 thus also compensates for a Coriolis effect acting on the inertial sensor navigation system 201, which can affect the measured data of inertial navigation system 201. For the position determination, strapdown algorithm unit 207 performs a double integration of the measured values captured by inertial navigation system 201 which describe accelerations over time. This allows for an update of a previously known position and an update of a previously known direction of the motor vehicle. In order to determine a speed or yaw rate of the motor vehicle, strapdown algorithm unit 207 performs a single integration of the measured data or values captured by inertial sensor navigation system 201 over time. This strapdown algorithm unit 207 also corrects the determined position by means of corresponding correction values of fusion filter 205. In this example, fusion filter 205 thus performs the correction only indirectly via strapdown algorithm unit 207. The measured values or physical quantities determined and corrected by strapdown algorithm unit 207, thus the position, the speed, the acceleration, the direction, the yaw rate and the rotational acceleration of the motor vehicle, are now performed on output module 212 and on fusion filter 205.

Here, the strapdown algorithm executed by what is referred to as strapdown algorithm unit 207 is not particularly complicated and can thus be implemented as a real-time capable base system. It represents a process sequence for integration of the measured values of inertial navigation system 201 for speed, direction and position and contains no filtering, resulting in an approximately constant latency and group delay.

Here, the term base system describes the sensor system, the measured data or values which are corrected by means of the measured data or values of the other sensor systems, referred to as correction systems. As already stated, these concern, for example, the correction system's odometry navigation system 203 and satellite navigation system 204.

Inertial navigation system 201, pre-processing unit 206 of inertial sensor navigation system 201 and strapdown algorithm unit 207, for example, together form what is referred to as the base system, which also partly includes fusion filter 205.

Output module 212 optionally forwards the physical quantities determined and corrected by strapdown algorithm unit 207 to further systems of the motor vehicle.

The measured values captured by satellite navigation system 204 are, for example, forwarded in the form of sensor signals via what is referred to as a UART (Universal Asynchronous Receiver/Transmitter) data link to pre-processing unit 208 of satellite navigation system 204. Pre-processing unit 208 now determines from the measured values output by satellite navigation system 204, which represent GPS raw data and also includes a description of the orbit of the GPS satellites sending the respective GPS signals, a position and speed of the motor vehicle in the GPS coordinate system. Satellite navigation system 204 further determines a speed of the motor vehicle relative to the GPS satellites, from which GPS signals are received. Pre-processing unit 208 also corrects a time error of a receiver clock of satellite navigation system 204 contained in the measured values, resulting from drift by the receiver clock, and by means of a correction model, the changes in signal traveling time and signal path caused by atmospheric effects in the GPS signals transmitted by the GPS satellites. Correction of the time error and the atmospheric effects takes place by means of correction values received from fusion filter 205 via the CAN bus.

Satellite navigation system 204 is also associated with plausibility checking module 209, which checks the measured values of the physical quantities output by pre-processing unit 208, thus the physical quantities of the position and the speed of the motor vehicle, for plausibility. The measured data or values checked for plausibility by plausibility checking module 209 are then output to fusion filter 205.

The system also includes pre-processing unit 210 of odometry navigation system 203, which, via the CAN bus, receives the measured values captured by odometry navigation system 203. The captured measured values are in this case the measured values of the individual wheel speed sensors and the measured values of the steering angle sensor. Pre-processing unit 210 now determines the position and direction of the motor vehicle in the motor vehicle coordinate system from the measured values output by odometry navigation system 203 according to what is referred to as a dead-reckoning method. The speed, acceleration, yaw rate and rotational acceleration of the motor vehicle are also determined likewise in the motor vehicle coordinate system. Pre-processing unit 210 further corrects the measured data or values received from odometry navigation system 203 by means of correction values received from fusion filter 205.

Odometry navigation system 203 is also associated with plausibility checking module 211 which checks the measured values output by pre-processing unit 210, thus the position, the direction, the speed, the acceleration, the yaw rate, and the rotational acceleration of the motor vehicle output by pre-processing unit 210 for plausibility. Since the faults in the measured values of odometry navigation system 203 are frequently random faults caused by environmental factors unrelated to white noise, in the case of comparatively high wheel-slip, for example, the measured values determined by inertial navigation system 201 and by satellite navigation system 204 are used to check the measured values of odometry navigation system 203 for plausibility. Here also, however, the measured values are initially compared with an associated sensor-specific model, which takes measurement uncertainties, such as the effects of noise, into account. Where the measured values correspond to the model within the stated tolerance ranges, an initial plausibility check is performed and the values checked for plausibility in this way are further processed. The plausibility-checked values are then forwarded to fusion filter 205. Where no plausibility checking of these measured values is possible, the corresponding measured values are discarded and not forwarded.

Here, the individual plausibility checking module 209 and plausibility checking module 211, with the partial involvement of fusion filter 205, together form a plausibility checking module within the meaning of the invention.

Fusion filter 205 is, for example, designed as an error state space Kalman filter. The main task of fusion filter 205 is, for example, to correct the measured values of the base system, thus of inertial navigation system 201, by means of measured values from odometry navigation system 203 and satellite navigation system 204, which constitute the correction systems, or to output corresponding correction values to strapdown algorithm unit 207. Since inertial navigation system 201 is, for example, assumed to be free from random errors and external faults, the measured values of inertial navigation system 201 are afflicted exclusively by white noise. Because of the differing signal output delays of inertial navigation system 201, odometry navigation system 203 and satellite navigation system 204, the measured values of inertial navigation system 201 are stored over a period of 25 measuring epochs in an electronic data memory (not shown). It is thus ensured that for both the measured values of odometry navigation system 203 and satellite navigation system 204, measured values which were captured at exactly the same time from inertial navigation system 201 are available for plausibility checking, correction, or fusion.

Since the fusion filter 205 is what is referred to as an error state space Kalman filter, exclusively the quantitative error values of the measured values are determined and corresponding corrections performed. This simplifies and speeds up the fusion performed by fusion filter 205 of the measured values of inertial navigation system 201, odometry navigation system 203 and satellite navigation system 204 into a common fusion data set. This allows real-time capable position determination and correction of the position determination.

During an initialization of the sensor system described, from the measured values of odometry navigation system 203 and satellite navigation system 204, starting values are determined for those physical quantities which in the measured values of inertial navigation system 201 are only indirectly described, namely the speed, the position, the receiver clock error of satellite navigation system 204 and the receiver clock error drift of satellite navigation system 204. Similarly, the starting values for the error values are also determined as variances on the basis of the measuring inaccuracies of satellite navigation system 204 and of odometry navigation system 203.

The system shown in FIG. 2 represents what is referred to as a virtual sensor, wherein inertial navigation system 201, odometry navigation system 203 and satellite navigation system 204 are not components of the virtual sensor, however. A virtual sensor is a system which, independently of the nature of the sensor system involved—here, therefore, inertial navigation system 201, odometry navigation system 203 and satellite navigation system 204—always generates the same output data or outputs. Based on the output data or outputs, it is unclear which sensor systems are involved in the system.

The description of the example embodiments above is merely exemplary in nature and, thus, variations that do not depart from the gist of the invention are intended to be within the scope of the invention. Such variations are not to be regarded as a departure from the spirit and scope of the invention.

The invention claimed is:

1. A method for initializing a sensor fusion system for a vehicle, wherein the sensor fusion system comprises a base system and at least one correction system, the method comprising:
    measuring values by the base system and the at least one correction system, wherein the vehicle has a plurality of physical quantities associated therewith, and wherein the measured values directly or indirectly describe the physical quantities, the measured values having error values,
    determining with a controller for one of the base system and the at least one corrections system, the error values which describe deviations of the measured values from the described physical quantities, at least the physical quantities indirectly described in the measured values by the base system and the error values of the physical quantities cannot be determined during initialization of the sensor fusion system,
    for at least one of the physical quantities indirectly described in the measured values of the base system and the error values of the physical quantities, determining starting values for the sensor fusion system from the measured values of the at least one correction system; and
    wherein the base system is an inertial navigation system for the vehicle and the at least one correction system is one of a global satellite navigation system for the vehicle and an odometry navigation system for the vehicle.

2. The method according to claim 1, wherein the at least one correction system determines the starting values by independently processing the measured values.

3. The method according to claim 1, wherein determining starting values for the error values comprise determining variances based on measuring inaccuracies of the at least one correction system.

4. The method according to claim 1, wherein the physical quantities indirectly described in the measured values of the base system comprise at least one of speed, position, a receiver clock error of the global satellite navigation system and a receiver clock error drift of the global satellite navigation system.

5. The method according to claim 1, wherein determining the starting values comprises determining starting values progressively from the measured values of the at least one correction system.

6. The method according to claim 5, wherein determining the starting values comprise determining starting values from the measured values of the odometry navigation system.

7. The method according to claim 1, further comprising detecting and correcting the error values using an error state space kalman filter.

8. The method according to claim 1, further comprising inputting data into the sensor fusion system from at least one vehicle sensor.

9. The method according to claim 8, wherein the at least one vehicle sensor is at least one of: a wheel speed sensor, an acceleration sensor, a yaw sensor, and a steering angle sensor.

10. The method according to claim 1, wherein the inertial navigation system is a microelectromechanical system inertial measurement unit.

11. The method according to claim 1, wherein the satellite navigation system is a receiver for a global positioning system.

12. A system for initializing a sensor fusion system for a vehicle, comprising:
 a plurality of physical quantities associated with the vehicle;
 a base system wherein the base system is an inertial navigation system for the vehicle;
 a base system controller for the base system;
 at least one correction system controller of the at least one correction system;
 at least one correction system, wherein the at least one correction system is one of a global satellite navigation system for the vehicle and an odometry navigation system for the vehicle;
 wherein each of the base system controller and the at least one correction system controller is configured to capture measured values, the measured values directly or indirectly describe the physical quantities and include error values, the error values describe deviations of the measured values from the described physical quantities
 wherein at least the physical quantities indirectly described in the measured values of the base system and the error values of the physical quantities cannot be determined during initialization of the sensor fusion system, and
 wherein the sensor fusion system is configured to continuously fuse the measured values after a conclusion of the initialization into a fusion data set, and the sensor fusion system is configured to, for at least one of the physical quantities indirectly described in the measured values of the base system and the error values of the physical quantities, and determine starting values from the measured values of the at least one correction system.

13. The system according to claim 12, wherein the physical quantities indirectly described in the measured values of the base system comprise at least one of speed, position, a receiver clock error of the global satellite navigation system and a receiver clock error drift of the global satellite navigation system.

14. The system according to claim 12, wherein the starting values are based on the measured values of the odometry navigation system.

15. The system according to claim 12, further comprising at least one vehicle sensor for inputting data into the sensor fusion system.

16. The system according to claim 15, wherein the at least one vehicle sensor is at least one of: a wheel speed sensor, an acceleration sensor, a yaw sensor, and a steering angle sensor.

17. The system according to claim 12, wherein the base system controller and the at least one navigation system controller is configured to determine the starting values for the fusion system.

* * * * *